United States Patent Office 3,198,602
Patented Aug. 3, 1965

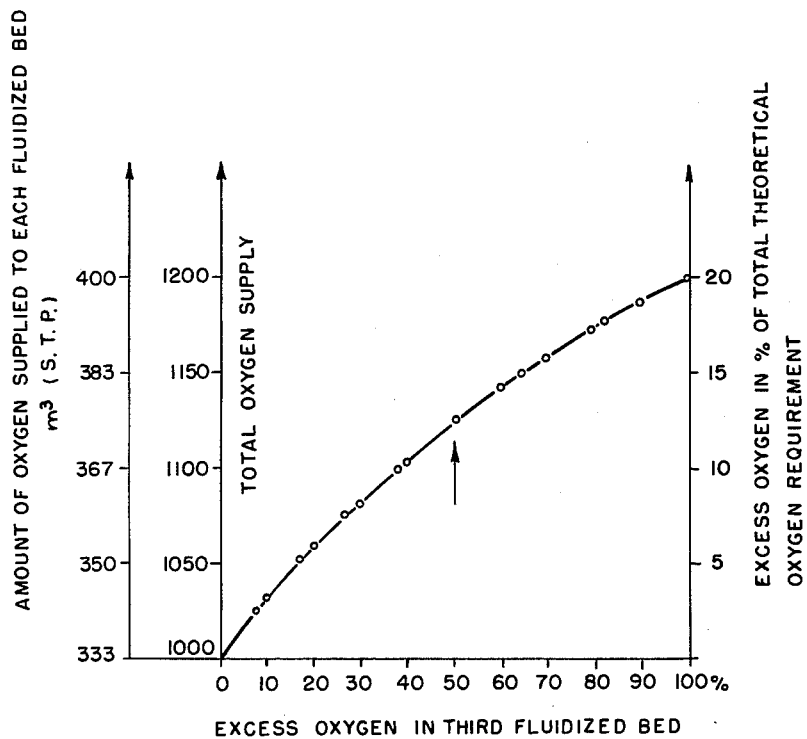

3,198,602
PRODUCTION OF GASES CONTAINING SULFUR DIOXIDE
Georg Wittmann, Ludwigshafen (Rhine), Germany, assignor to Badische Anilin- & Soda-Fabrik Aktiengesellschaft, Ludwigshafen (Rhine), Germany
Filed Aug. 3, 1962, Ser. No. 214,762
Claims priority, application Germany, Sept. 10, 1958, B 50,280
3 Claims. (Cl. 23—179)

This application is a continuation-in-part of my application Serial No. 835,816, filed August 20, 1959 now abandoned.

This invention relates to a process for producing gases containing sulfur dioxide by roasting sulfidic iron ore containing roastable sulfur besides lead and at least one of the elements arsenic and antimony, by which process there are obtained roasted residues which are practically free from lead, arsenic and antimony.

It has already been proposed according to U.S. Patent No. 2,889,203 to roast sulfidic materials containing arsenic and/or antimony, especially pyrites, with oxygen or gases containing free oxygen for the production of gases containing sulfur dioxide in fluidized beds in such a way that the roasted materials practically free from antimony and arsenic are obtained. For this purpose the oxygen required for the roasting is supplied as fresh gas to the individual fluidized beds separately and independently of each other and the roaster gas formed in the first fluidized bed is withdrawn separately from the roaster gas formed in one or more subsequent fluidized beds. The roasting is carried out at temperatures between 550° and 880° C., preferably between 750° and 800° C., in the first fluidized bed and between 750° and 880° C. in one or more subsequent fluidized beds.

In the roasted material obtained in the first fluidized bed roasting stage a content of sulfide sulfur of at least 3% by weight should be maintained. This value can be adjusted to up to 30% or somewhat above by varying the amount of air supplied per unit by weight of pyrites. Roasting is completed in the subsequent stage or fluidized bed roasting stages. The roasting effect may be improved by using oxygen in excess over the amount theoretically necessary, so that the sulfur content in the subsequent fluidized bed roasting stages reaches a minimum, i.e., usually falls below 1%. At the said temperature of 750° to 800° C., volatilization of lead occurs when roasting materials containing lead, but only in the first fluidized roasting stage. The amount volatilized is about 30 to 60% of the lead content of the material to be roasted. For various reasons, however, a considerably lower lead content is desirable in the utilization of the roasted material.

I have found that roasted materials which are practically free from lead can be obtained by carrying out roasting in three successive separate fluidized bed roasting stages, about one third of the total amount of oxygen supplied for roasting being supplied to each of the individual fluidized beds and maintaining a sulfidic sulfur content of 38 to 26% by weight in the first roasting stage and a sulfidic sulfur content of 19 to 10% by weight in the second roasting stage.

Sulfidic materials especially suitable for roasting contain roastable sulfur in an amount of about 40 to 53% by weight. By supplying, in accordance with this invention, about one third of the total amount of oxygen used to each of the fluidized bed roasting stages, such a content of sulfide sulfur is attained in the first and second fluidized bed roasting stages, that nearly complete volatilization of lead is assured in the second fluidized bed roasting stage, while in the third fluidized bed roasting stage roasting is completed, the sulfur content being adjusted to below 1% in this third stage.

The temperatures are about 550° to 800° C., preferably 550° to 600° C., in the first stage, above 800° to about 1,000° C., preferably 900° to 1,000° C., in the second stage, and 550° to 800° C., preferably 650° to 750° C., in the third stage.

Oxygen is supplied to the last fluidized bed in an excess of 10 up to 50% of the amount theoretically necessary in this roasting stage, in order to achieve satisfactory desulfurization of the roasted material.

When supplying to each fluidized bed roasting stage one third of the total amount of oxygen theoretically necessary, the last third introduced into the last stage is used up to a lesser extent the larger the excess over the total amount theoretically necessary. The relationships are illustrated in the accompanying drawing, the curve satisfying the equation:

$$y = \frac{100x}{100n + x(n-1)}$$

where $y$ is the excess of oxygen in percent of the total amount theoretically nevessary, $x$ is the excess of oxygen in the last fluidized bed roasting stage in percent, and $n$ is the number of fluidized bed roasting stages.

The curve shows, inter alia, that when using a 20% excess of oxygen over the total amount theoretically necessary, the excess of oxygen in the third fluidized bed roasting stage in a three-step process is as large as 100%.

When using a total amount of oxygen such that the excess in the third stage is up to about 50% of the amount theoretically necessary in this stage, the excess of oxygen over the total theoretical oxygen requirement may be at the most 12.5%, reference being made to the arrow marking in the diagram. Thus, when dividing the total oxygen requirement for all stages into three equal portions, the share for each stage is 12.5% in excess of one third of the total theoretical requirement. The additional 12.5% results in an excess in the third stage of 50% of the amount of oxygen theoretically necessary in this stage, as in the preceding stages the oxidation advanced according to the increased oxygen supply.

The said value is critical insofar as the oxygen supply in the preceding stages is further increased when this value is exceeded. A larger oxygen supply would result in the sulfide sulfur portion in the second fluidized bed roasting stage not being maintained at a sufficiently high level to prevent the formation of ferrites at the temperatures applied.

Of the above limits specified for the sulfide sulfur content in the first and second fluidized bed roasting stages (38 to 26% and 19 to 10% S, respectively) the upper figure corresponds to an exces of oxygen in the third fluidized bed roating stage of 10%, the lower figure of 50%.

By dividing the total oxygen requirement into three equal portions in accordance with this invention, the formation of elemental sulfur in the roaster gas in the first fluidized bed roasting stage is avoided, while in the second fluidized bed roasting stage the sulfide sulfur content in the roasted product is maintained at such a level that no ferrites are formed at the temperature applied with the copper and zinc contained in the roasted ore.

The new method ensures that even the reaction in the third fluidized bed roasting stage is autothermic, so that no additional fuel or heat carrier is required. The three portions into which the oxygen requirement is to be divided should be substantially equal, as major deviations will result in disadvantages. When increasing the oxygen portion for the first fluidized bed roasting stage above one third, the sulfide sulfur content in the second fluidized bed roasting stage falls below 10%, so that the formation of ferrites cannot be avoided at the said temperatures, and the concentration of roaster gases leaving the third fluidized bed roasting stage falls sharply, the autothermic reaction in this stage eventually coming to a standstill. When reducing the oxygen supply in the first fluidized bed roasting stage to below one third of the total theoretical requirement, the occurrence of elemental sulfur in the roaster gases formed in this stage cannot be safely precluded.

It is only by subdividing the roasting process into three stages in accordance with this invention that an almost complete volatilization of lead can be achieved, because only then is it possible to maintain a temperature of more than 800° C. in a fluidized bed and to carry out a partial roasting without the risk of softening phenomena in the solid material. If such a high temperature were to be maintained in the first fluidized bed roasting stage as would be necessary for the complete removal of lead, the roasting material would become softened or fused. In the second fluidized bed roasting stage such phenomena do not occur until above about 1,000° C. because the pre-roasted products have softening temperatures which lie in general about 200° to 250° C. higher than those of the initial material.

By maintaining a temperature of preferably 550° to 600° C. in the first fluidized bed roasting stage, substantial sputtering of the particles of material to be roasted such as occurs when the feed is rapidly heated up, as is characteristic of fluidized beds, is avoided and consequently a coarse-grained roasted material is obtained. The preservation of the coarsely granular nature of the material to be roasted not only has a favorable effect on the removal of the lead and especially on the removal of arsenic and antimony, but is also of decisive importance for the further processing of the roasted material. During the preliminary roasting in the first fluidized bed roasting stage at the preferred temperature of 550° to 600° C., the arsenic and antimony content of the material being roasted is expelled down to a residual amount of about 0.1% in all; this residual portion of arsenic and antimony and also the lead are volatilized in the second fluidized bed roasting stage.

For processing the roasted material, especially roasted material containing copper and zinc, it is important that temperatures above 800° C. should be avoided in the third fluidized bed roasting stage in order thus to prevent the formation of copper and zinc ferrites. There is no formation of ferrites in the second fluidized bed roasting stage, even at temperatures above 800° C., by reason of the sulfide sulfur still present therein. The subdivision of the oxygen supply into three portions in the roasting according to this invention, for example in the roasting of a pyrite with a content of 48% of sulfide sulfur, brings about the formation in the first fluidized bed roasting stage of a roasted material with about 30% of sulfur and in the second fluidized bed roasting stage a roasted material with about 15% of sulfur, while the sulfide sulfur content in the third fluidized bed roasting stage falls to less than 1% of sulfur in the roasted material. The roasting material may be transferred from one fluidized bed to another by using the force of gravity.

Since a part of the roasted material is carried away from each fluidized bed roasting stage in the form of flue dust with the roaster gas, it is preferable to separate this flue dust in a hot cyclone the temperature of which is kept at about the same height as that of the fluidized bed to which the cyclone is attached, and to supply it hot, together with the coarse material from the said fluidized bed, to the fluidized bed in the following roasting stage. It is preferable to lead the coarse material through the dust outlet of the cyclone into the following fluidized bed.

By means of cooling surfaces installed in the individual fluidized beds it is possible to withdraw the excess of reaction heat beyond that required for maintaining the desired temperature in the fluidized bed and for covering the heat loss by radiation, and if desired to utilize it, together with the sensible heat of the products of the roasting, especially the roaster gases, for the production of hot water and/or steam.

The following example will further illustrate this invention, but the invention is not restricted to this example.

*Example*

4,750 kilograms of pyrites with 46.2% of sulfur, 1.0% of As, 0.08% of Sb and 0.5% of Pb and having a maximum grain size of 10 millimeters, and 3,600 m.$^3$ (S.T.P.) of air are introduced into a fluidized bed at a temperature of 600° C. The temperature of 600° C. is maintained in the bed by means of cooling surfaces. There are formed per hour 3,580 m.$^3$ (S.T.P.) of roaster gas with 29.5% of $SO_2$ which is led through a hot cyclone at 590° C. The flue dust separated in the cyclone and the pre-roasted material withdrawn direct from the fluidized bed with a total weight of 3,620 kilograms and a content of 30.5% of S, 0.041% of As, 0.048% of Sb and 0.65% of Pb are continuously supplied to a second fluidized bed in which, also by means of cooling surfaces, a temperature of 950° C. is maintained and to which 3,400 m.$^3$ (S.T.P.) of air is supplied per hour.

3,110 m.$^3$ (S.T.P.) of roaster gas with 13.4% of $SO_2$ leaves the second fluidized bed per hour and is supplied through a cyclone heated to 900° C. The flue dust separated in this cyclone and the roasted product withdrawn direct from the second fluidized bed with a total weight of 3,380 kilograms and a content of 14.5% of S, 0.008% of As, 0.011% of Sb and 0.026% of Pb are supplied continuously to a third fluidized bed the temperature of which is maintained at 750° C. by inbuilt cooling surfaces and into which 3,800 m.$^3$ (S.T.P.) of air is introduced per hour. There are obtained per hour 3,240 kilograms of roasted ore with a content of 0.8% of S, 0.008% of As, 0.011% of Sb and 0.027% of Pb as well as 3,580 m.$^3$ (S.T.P.) of roaster gas with 8.8% of $SO_2$. The height of the individual fluidized beds is 70 cm. The roaster gases from the three fluidized beds are purified separately and passed on for further processing.

What I claim is:

1. In a fluidized bed process for roasting sulfidic iron ore containing lead and at least one of the elements arsenic and antimony with a gas containing free oxygen to produce sulfur dioxide by carrying out the roasting in three successive separate fluidized bed roasting stages, the gas containing free oxygen being supplied as fresh gas to said stages separately to each stage and the roaster gas formed in said stages being withdrawn separately from each stage and the solid particles in each stage being prevented from entering a preceding stage, the improvement for producing completely roasted solid residue substantially free of said lead, arsenic and antimony which comprises: supplying to each of said stages approximately one third of the total amount of said gas containing free oxygen being supplied for the roasting, the amount of free oxygen supplied to the third fluidized bed being in an excess of 10% up to 50% of the amount theoretically required for complete roasting, maintaining a sulfide sulfur content of 38 to 26% by weight in the first stage and a sulfide sulfur content of 19 to 10% by weight in the second stage and maintaining a temperature of about 550° to 800° C. in the first stage, a temperature of at least 800° up to 1,000° C. in the second stage and a temperature of about 550° to 800° C. in the third stage.

2. In a fluidized bed process for roasting a sulfidic iron ore containing lead and at least one of the elements arsenic and antimony with a gas containing free oxygen to produce sulfur dioxide, by carrying out the roasting in three successive fluidized bed roasting stages, the gas containing free oxygen being supplied as fresh gas to said stages separately to each stage and the roaster gas formed in said stages being withdrawn separately from each stage and the solid particles in each stage being prevented from entering a preceding stage, the improvement for producing completely roasted solid residue substantially free of said lead, arsenic and antimony which comprises: supplying to each of said stages approximately one third of the total amount of said gas containing free oxygen being supplied for the roasting, the amount of free oxygen supplied to the third fluidized bed being in an excess of 10% up to 50% of the amount theoretically required for complete roasting, maintaining a sulfide content of 38 to 26% by weight in the first stage and a sulfide sulfur content of 19 to 10% by weight in the second stage, and maintaining a temperature of about 550° to 600° C. in the first stage, a temperature of 900° to 1,000° C. in the second stage and a temperature of 650° to 750° C. in the third stage.

3. In a fluidized bed process for roasting a sulfidic iron ore containing lead, at least one of the elements arsenic and antimony and at least one of the elements copper and zinc with a gas containing free oxygen to produce sulfur dioxide and to produce a substantially completely roasted solid residue substantially free of said lead, arsenic and antimony and containing no ferrites of copper and zinc, the improvement which comprises: conducting the roasting in three separate fluidized bed roasting stages; supplying to each of said stages, separate from and independent of each other, approximately one third of the total amount of oxygen-containing gas theoretically required for complete roasting; maintaining a temperature of about 550° to 600° C. in the first stage while roasting said ore to remove the combined content of arsenic and antimony down to about 0.1% by weight, to maintain the sulfide sulfur content at about 38 to 26% by weight in said first stage and to produce a solid residue having a softening point above about 1,000° C.; maintaining a temperature of about 800° to 1,000° C. in the second stage while roasting the solid residue from said first stage to volatilize said lead and the residual content of said arsenic and antimony, the sulfide sulfur content in said second stage being maintained at about 19 to 10% by weight and sufficient to prevent the formation of copper and zinc ferrites; and maintaining the third stage at a temperature of 650° to 750° C., said temperature being sufficiently low to prevent formation of copper and zinc ferrites, while roasting the solid residue from said second stage to substantially complete the conversion of sulfur to sulfur dioxide; flue gases from the individual stages not being commingled and not contacted with one another and roasted residue being prevented from entering a preceding stage.

References Cited by the Examiner

UNITED STATES PATENTS

| | | | |
|---|---|---|---|
| 2,867,526 | 1/59 | Heath et al. | 75—9 |
| 2,889,203 | 6/59 | Pfannmueller et al. | 23—177 |

FOREIGN PATENTS

| | | |
|---|---|---|
| 619,422 | 5/61 | Canada. |

MAURICE A. BRINDISI, *Primary Examiner.*

UNITED STATES PATENT OFFICE
CERTIFICATE OF CORRECTION

Patent No. 3,198,602                      August 3, 1965

Georg Wittmann

It is hereby certified that error appears in the above numbered patent requiring correction and that the said Letters Patent should read as corrected below.

Column 1, lines 41 and 42, for "Roasting is completed in the subsequent stage or fluidized bed roasting stages." read -- Roasting is completed in the subsequent fluidized bed roasting stage or stages. --; column 2, line 54, for "roating" read -- roasting --.

Signed and sealed this 15th day of March 1966.

(SEAL)
Attest:

ERNEST W. SWIDER
Attesting Officer

EDWARD J. BRENNER
Commissioner of Patents